United States Patent Office 3,734,933
Patented May 22, 1973

3,734,933
ARYLTHIOANTHRAQUINONES
Guido R. Genta, Snyder, N.Y., assignor to American Aniline Products, Inc., Lock Haven, Pa.
No Drawing. Filed Mar. 8, 1972, Ser. No. 232,969
Int. Cl. C09b 1/56
U.S. Cl. 260—371  4 Claims

ABSTRACT OF THE DISCLOSURE

A new series of compounds, 1-arylsulfonamido-5(or 8)-arylthioanthraquinones, are provided. 1,5(or 1,8)-dichloroanthraquinone is condensed with an arylsulfonamide to produce an intermediate monochloro-arylsulfonamidoanthraquinone intermediate, which is then converted into the desired final product by condensation with an aromatic mercaptan. The compounds provide bright yellow dyeings of excellent fastness properties on polyester fabrics, and are also useful for the coloration of rigid plastic materials in yellow shades.

BACKGROUND OF THE INVENTION

Arylthioanthraquinones have long been known in the art as dyestuff intermediates. An extensive discussion of this series of compounds has been made by Gattermann [Liebig's Annalen, 393, 113 (1912)]. In recent years, certain arylthioanthraquinones have been proposed as dyestuffs for polyester fabrics. For example, U.S. Pat. 3,164,436, of Hans Altermatt, discloses arylthioanthraquinones wherein one benzene ring contains an arylthio group and the other benzene ring may contain a further substituent. As the substituents mentioned by Altermatt are the halogen atoms, such as chlorine and bromine, hydroxy, alkoxy, alkyl, alkylthio, nitro and amino groups, including amino substituted by alkyl, cycloalkyl, aralkyl and aryl. Although Altermatt indicates that any of the above substituents may be present in addition to the arylthio group, the patentee found that the preferred groups are the alkylamino and acetyl groups. Compounds containing a benzamido substituent have been investigated but have not proven satisfactory as dyes for polyester fibers. Although compounds within the scope of the Altermatt patent have been found to produce yellow dyeings on polyethylene terephthalate, the dyeings have not proved altogether satisfactory and the search for compounds which produce yellow dyeings on polyester fabrics, which dyeings are of excellent fastness properties, has continued.

In my copending application, Ser. No. 823,183, filed May 8, 1969, I have disclosed a series of arylthioanthraquinones which produce dyeings on polyethylene terephthalate of excellent characteristics including outstanding substantivity, and excellent fastness to light and sublimation. The compounds disclosed in that copending application are, however, blue, and therefore do not solve the problem of the production of a dye of the desired properties which will impart a bright yellow shade to the polyester fabric.

I have now discovered a new class of arylthioanthraquinones which are 1-arylsulfonamido-5(and 8)-arylthioanthraquinones, and which have the desired characteristics, and impart a bright yellow shade to polyester fabrics. Particularly, dyeings with the compounds of the invention on polyester have been found to possess excellent sublimation resistance. The compounds of the invention may also be used to impart a bright yellow color to rigid plastic materials.

SUMMARY OF THE INVENTION

In accordance with the invention there are provided 1-arylsulfonamido-5 (and 8)-arylthioanthraquinones of the following formula:

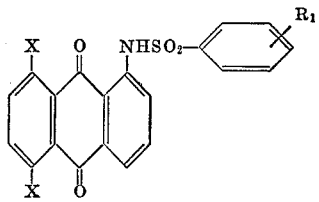

wherein one X is hydrogen and the other X is an arylthio group of the formula

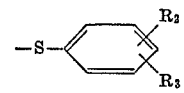

wherein each of $R_1$, $R_2$ and $R_3$ is independently selected from the group consisting of hydrogen, lower alkyl, nitro, lower alkoxy, hydroxy-(lower alkyl), chlorine, and bromine.

The 1-arylsulfonamido-5 (and 8)-arylthioanthraquinones of the invention are produced from 1,5 (and 1,8)-dichloroanthraquinones through the condensation with an arylsulfonamide to produce an intermeditae 1-arylsulfonamido-5 (and 8)-chloroanthraquinone, which is converted to the desired final product through condensation with a suitably substituted benzenethiol.

The compounds of the invention provide dyeings on polyester having a bright yellow shade, which dyeings possess outstanding fastness characteristics, including excellent light and sublimation fastness. The compounds are also useful as coloring agents for plastic materials.

DETAILED DESCRIPTION

The basic starting material used in the synthesis of the compounds of the invention is a dichloroanthraquinone of the formula:

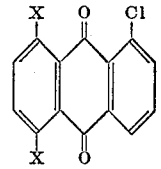

(II)

wherein one X is hydrogen and the other X is chlorine. The dichloroanthraquinone starting material is produced through well known methods. For example, anthraquinone can be disulfonated and the introduced sulfo groups can be replaced by chlorine through procedures known to those skilled in the art. The dichloroanthraquinone starting material is condensed with an appropriate arylsulfonamide of the formula:

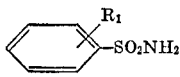
(III)

wherein $R_1$ is as defined above. Among the suitable arylsulfonamides are: benzenesulfonamide; p-toluenesulfonamide; p-ethylbenzenesulfonamide; p-chlorobenzenesulfonamide; p-bromobenzenesulfonamide; N-4-acetylsulfanilamide; p-nitrobenzenesulfonamide; p-methoxybenzenesulfonamide; p - ethoxybenzenesulfonamide; 2,4-xylenesulfonamide. The condensation is conducted preferably in the presence of a high boiling polar organic solvent; i.e., a solvent having a boiling point of at least 120° C. Useful solvents include n-pentanol, 2-methoxyethanol, 2-ethoxyethanol, n-amyl alcohol, 2-ethoxyethyl acetate, diacetone alcohol, ethylene glycol, benzyl alcohol, diethylene glycol, 2-butoxyethanol, tetrahydrothiophene-1,1-dioxide, N,N-dimethylformamide, N,N-dimethylacetamide, and the like. Preferred solvents include ketones as 5-methyl-2-hexanone ("methyl isoamyl ketone"); 2,4-dimethylpentanone and the like.

The dichloroanthraquinone (II) is added to the solvent in a suitable reactor and the arylsulfonamide (III), e.g. benzenesulfonamide, p-toluenesulfonamide or chlorobenzenesulfonamide, is added thereto. The reaction is run by heating in the presence of an acid acceptor or acid-binding agent, such as an alkali metal carbonate, bicarbonate or acetate. The efficiency of the reaction is improved by the presence of a copper catalyst, such as copper sulfate or copper acetate. The reaction mixture is heated to an elevated temperature between about 120° C. and the boiling point of the solvent and held at that temperature until the reaction is complete, which generally requires 10-20 hours.

The condensation yields an intermediate product having the formula

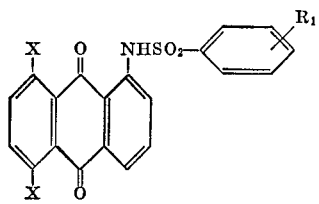
(IV)

wherein X and $R_1$ are as defined above. The reaction mixture containing the intermediate (IV) is cooled and a benzenethiol is charged thereto, the benzenethiol having the following formula:

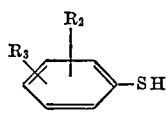
(V)

in which $R_2$ and $R_3$ are as previously defined.

Useful benzenethiols include benzenethiol; m-chlorobenzenethiol; p-chlorobenzenethiol; m-bromobenzenethiol; p-bromobenzenethiol; 4-chloro-2-nitrobenzenethiol; 2,4-dichlorobenzenethiol; 2,5-dichlorobenzenethiol; p-nitrobenzenethiol; p-methoxybenzenethiol; p-t-butylbenzenethiol; m - methoxybenzenethiol; p - ethoxybenzenethiol; 2-phenylthioethanol; 2,3,5-trichlorobenzenethiol; o-methoxybenzenethiol; m-mercaptobenzyl alcohol; p-mercaptobenzyl alcohol and 2,5-dimethoxybenzenethiol.

The reaction with the benzenethiol (V) is also carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like.

At least one equivalent of halogen acceptor is required for each mole of thiophenol present.

The final reaction generally takes from 5-10 hours. After the reaction is complete, the mixture is allowed to cool to 30-60° C. with agitation. The product is separated by filtration, and, if desired, washed with alcohol, water or both.

The final product has the formula:

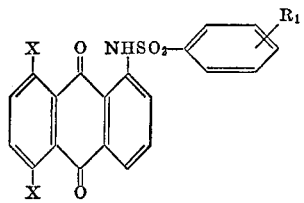

where one X is hydrogen and the other is an arylthio group of the formula

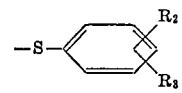

wherein each of $R_1$, $R_2$ and $R_3$ is independently selected from the group consisting of hydrogen, lower alkyl, nitro, lower alkoxy, hydroxy(lower alkyl), chlorine, and bromine.

As preferred lower alkyl groups may be mentioned those groups containing from 1 to 4 carbon atoms; exemplary are methyl, ethyl, n-propyl, isopropyl, n-butyl and t-butyl. As preferred lower alkoxy groups may be mentioned those groups containing from 1 to 4 carbon atoms; exemplary are methoxy, ethoxy, n-propoxy, isopropoxy, n-butoxy, 2-methyl-n-propoxy, sec-butoxy, and t-butoxy. As preferred hydroxy-(lower alkyl) groups may be mentioned those groups containing 1 to 4 carbon atoms, and include hydroxymethyl, 2-hydroxyethyl, 3-hydroxypropyl, 2-hydroxypropyl, 4-hydroxybutyl and 3-hydroxybutyl.

The compounds of the invention may be used either alone or in the form of mixtures of several compounds of the Formula I. Preferred mixtures are obtained by using as the starting dichloroanthraquinone (II) a mixture of the 1,5 and 1,8 isomers.

To prepare the product for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10-40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40–100° C. (104–212° F.) to give a colored fiber containing about 0.01–2 percent by weight dye (100% color basis).

Alternatively, dyeing may be accomplished without a carrier at temperatures of 100–150° C. under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180–220° C. (356–428° F.) are used for 30 to 90 seconds. If the fabric contains cotton or viscose rayon, apart from synthetic fibers, there is little danger of damaging cellulosic portions, but if wool is present, the temperature must be kept within 180–200° C. and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

The compounds of the invention may be used for the coloration of rigid plastic substrates. The rigid plastic substrates contemplated within the scope of the invention are those plastic materials capable of being pigmented with the compounds of the invention, and will be referred to herein as "rigid plastic substrates." The rigid plastic substrates of the invention include those materials capable of being formed into a shaped article, including semi-rigid materials which may be deformed by application of pressure.

As rigid plastic substrates of the invention may be mentioned terpolymers, including acrylonitrile-styrene-butadiene, often known as ABS; acrylics, including methacrylics; polystyrene, both foamed and rubber modified polysulfones; cellulosic derivatives, particularly esters such as cellulose acetate, propionate and butyrate; polyamides such as nylon; epoxy and phenolic resins; polycarbonates; and polyesters. It is understood that the rigid plastic substrates include those materials capable of being pigmented with the compounds of the invention, and therefore copolymers of the above classes of compounds, such as styrene-butadiene, are also within the scope of the invention.

Specific examples of thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene adipamide, polyhexamethylene sebacamide, polycaprolactam, polymethyl methacrylate, polyacrylonitrile, polymethyl acrylate, polyethyl methacrylate, and styrene/methyl methacrylate.

As preferred rigid plastic substrates of the invention may be mentioned the polyacrylate, polystyrene and polycarbonates.

The rigid plastic substrates are colored with the compounds of the invention through pigmentation processes. The compounds are admixed with the plastic using sets of mixing rollers, mixing or milling apparatus. After the compounds and the plastic have been thoroughly mixed, the resultant colored mixture is shaped into the desired final form through procedures well known to those skilled in the art, such as pouring, calendering, extrusion, spreading, or injection molding. Where the desired product is a semi-rigid material, plasticizers may advantageously be added prior to shaping into the desired final form. As plasticizers suitable for this purpose may be mentioned esters of phthalic acid. Although the plasticizer may be incorporated after the mixing of the compound of the invention with the rigid plastic substrate, it also can be incorporated into the rigid plastic material prior to mixing the pigment with the rigid plastic material. In order to vary the strength of the finished product or vary the color, it is also possible to add additional pigments or fillers in an amount sufficient to obtain the desired effect.

The amount of the compound of the invention which is used to color the rigid plastic substrate may vary widely depending upon the degree of color wished to be imparted to the final product, and depending upon whether the compound of the invention is the sole colorant or whether it is used in admixture with other plastic colorants. When the compound of the invention is used in admixture with other colorants, obviously a very minute quantity may be used to produce a complementary effect. Generally, the amount of colorant comprises less than 15%, preferably less than about 8%, by weight in relation to the rigid plastic substrate. An amount of colorant compound which has proved particularly valuable is about 0.0001% to about 1%.

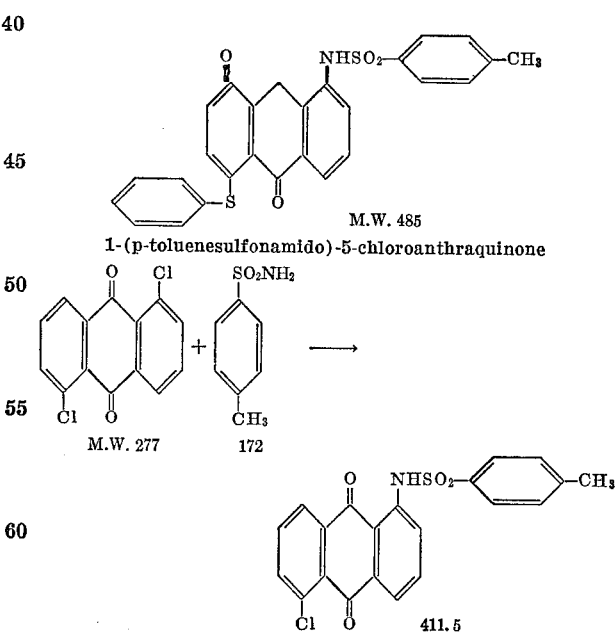

1-(p-toluenesulfonamido)-5-chloroanthraquinone

To a one liter flask were charged 400 g. methyl isoamyl ketone B.P. 142–147°
112 g. 1,5-dichloroanthraquinone
84 g. p-toluenesulfonamide
36 g. potassium acetate
3 g. copper acetate.

The mixture was heated to 150–155°, distilling off about 20 cc. of solvent. It was then held at 155–160° during an additional twelve hour period. The reaction mass was cooled to 70° and was diluted with 160 g. ethanol denatured.

The mass, while stirring, was allowed to cool to 30° C. The material which settled was collected on a suction filter and washed with 320 g. denatured ethanol, followed by hot water. It was then dried at 80° C. Yield: 133 g. dry material.

EXAMPLE II 1-(p-toluenesulfonamido)-5-thiophenoxyanthraquinone

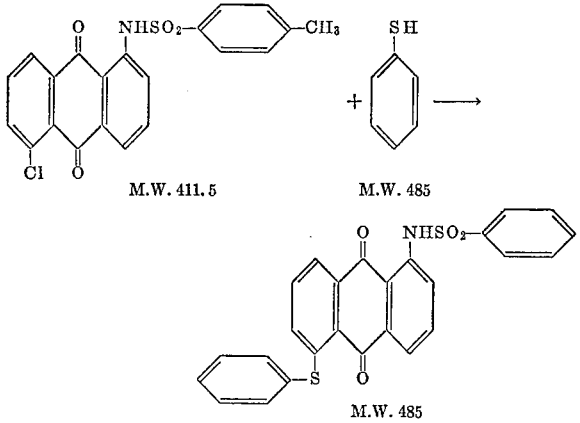

To a two liter flask were charged 800 g. 2-methoxyethanol
41 g. potassium carbonate
41 g. thiophenol The mixture was heated to 65–70° and was agitated at this temperature during one hour. Then 133 g. 1-(p-toluenesulfonamino)-5-chloroanthraquinone were charged.

The reaction temperature was slowly raised to 120–125° and was held for an additional 12 hours. After cooling to 30° the mass was slowly diluted with a solution of 20 g. glacial acetic acid in 100 g. denatured ethanol.

The product obtained was filtered and washed alkali-free with water.

Yield: 330 g. wet cake at 45%=150 g. 100% dye. Residual chlorine 0.5%.

Polyester dyeing

Above cake was ground to a 15% paste using 20% "Marasperse N-22" on the final weight of paste obtained. Yield: 1000 g. paste (15% dye content).

EXAMPLE III

The cake of Example II was ground to a 15% paste using 20% "Marasperse N-22" based on the final weight of paste obtained to yield 1000 grams of paste, having a 15% dye content. A dyeing on polyethylene terephthalate of excellent properties of fastness to light and sublimation and having a bright reddish yellow shade is obtained. No sublimation was observed when the dyed fabric was tested at 350° C. The test was repeated at 400° C. and still no staining was observed, demonstrating the remarkable sublimation resistance of the dyeings with the compounds of the invention. The dyeing was also tested for staining on cotton; no staining of the cotton was observed, showing the excellent reserve on cotton for dyeings with compounds of the invention.

EXAMPLE IV

The compound of Example II when dyed on poly(1,4-cyclohexanediol) terephthalate provides comparable reddish yellow dyeings of excellent properties.

EXAMPLE V

When the compound of Example II is used to pigment poly(methyl methacrylate), a rigid plastic material having a reddish yellow shade is obtained. A typical coloration procedure is as follows:

Methyl methacrylate resin is colored with the compound of Example 1 as the colorant, in a ratio of 2 grams resin to 1 mg. colorant. The resin is prepared by placing 1 lb. of methyl methacrylate into a Thropp mill (a 2-roller mill), which is then heated and run in order to melt and smash the resin to a molten mass. The compound of claim 1 is added and the entire mixture of resin and colorant is milled until the colorant is uniformly distributed in the mass as measured by eye. While still hot, 30 grams of the hot mass is cut off for use in the following procedure. The sample, containing 30 grams methyl methacrylate and 15 mg. of the compound of claim 1 as colorant, may be conveniently molded in a Laboratory 40 Single Acting Watson-Stillman Laboratory Press (Farrell-Birmingham Co. 50-ton press). 30 grams of methyl methacrylate mixture containing 15 mg. of the compound of Example I per pound of methyl methacrylate is placed in the cold mold, which is then closed with the Schrader Valve. The drain is opened and steam is applied to the mold. When steam comes through the drain pipe, the drain is closed. Up to 25.0 tons pressure is exerted on the chips until the mold is fully closed. This can conveniently be accomplished by observing the pressure gauge. When the gauge needle no longer decreases in pressure, then the mold is closed.

The mold is held closed at zero pressure by releasing the hydraulic pressure and maintaining the steam for five minutes. The mold pressure is increased to 10 tons and held for ten minutes, the steam remaining on.

The mold pressure is increased to 15 tons and the steam shut off; the drain is opened and cooling water is added for five minutes. Thereafter the pressure is changed to zero and the mold is opened to extract the resultant plastic chip.

EXAMPLE VI

When the 30 gram mixture of methyl methacrylate and the compound of Example II are replaced by 2 pounds polystyrene, 10.44 grams titanium dioxide and 227 mg. of the compound of Example II, following the procedure of Example V a fast coloration of the polystyrene is obtained.

The compound of Example II may also be used as a colorant to impart a reddish yellow shade to plastics made from polycarbonates. A pigmented plastic material of polycarbonates and the compound of Example II may be prepared according to the following procedure:

A specimen is prepared by dry mixing pelletized or powdered resin with finely divided colorant until uniform distribution is achieved of the colorant in the resin material. Plasticizer may also be added, if desired. The mixture is then extruded or injected molded under suitable conditions, 454 mgs. Lexan 121-R (General Electric) pellets are placed in Bipel one ounce reciprocating screw injection molder. The pellets are tumbled for five minutes on the barrel tumbler. The resin is heated (front zone temperature of 550° F. and rear zone temperature of 500° F.) and chips are produced from the virgin resin until chips of good quality are obtained. When the desired quality of chips are obtained with the clear resin, a fresh batch of Lexan 121-R, containing the compound of Example I in an equivalent amount corresponding to Example II to produce a pigmented plastic material is fed into the injection molder, to produce yellow pigmented chips having excellent fastness characteristics.

EXAMPLES VII–XXII

By following the procedures of Examples I and II, the following compounds are obtained. The compounds dye polyethylene terephthalate when dyed according to the procedure of Example III:

| Example | Compound |
|---|---|
| VII | 1-p-chloro benzenesulfonamido-5-phenylthioanthraquinone. |
| VIII | 1-p-ethoxy benzenesulfonamido-5-phenylthioanthraquinone. |
| IX | 1-p-toluenesulfonamido-8-phenylthioanthraquinone. |
| X | 1-benzenesulfonamido-5-(p-methoxy phenylthio)anthraquinone. |
| XI | 1-p-toluenesulfonamido-5-p-tolylthioanthraquinone. |
| XII | 1-p-nitrobenzenesulfonamido-5(p-chlorophenylthio)anthraquinone. |
| XIII | 1-p-t-butyl benzenesulfonamido-8-phenylthioanthraquinone. |
| XIV | 1-p-toluenesulfonamido-8-[p(2-hydroxyethylphenylthio] anthraquinone. |
| XV | 1-p-toluenesulfonamido-5-(2,4-dimethylphenylthio)anthraquinone. |
| XVI | 1-p-acetamidobenzenesulfonamido-8-(p-bromophenylthio) anthraquinone. |
| XVII | 1-(2,4-xylenesulfonamido)-8-(m-hydroxymethylphenylthio) anthraquinone. |
| XVIII | 1-(p-n-butylbenzenesulfonamido)-5-[p-)2-hydroxyethyl) phenylthio[anthraquinone. |
| XIX | 1-p-ethylbenzenesulfonamido-8(p-nitrophenylthio)anthraquinone. |
| XX | 1-p-toluenesulfonamido-8-(2,3,5-trichlorophenylthio)anthraquinone. |
| XXI | 1-p-toluenesulfonamido-5-(2,5-dimethoxyphenylthio)anthraquinone. |
| XXII | 1-benezenesulfonamido-5-(4-chloro-2-nitrophenylthio)anthraquinone. |

EXAMPLE XXIII

To a one liter flask were charged 3500 cc. methylcellosolve,
13 g. thiophenol, and
15 g. potassium carbonate.

The mixture was heated to 75–80° C. and 30 g. 1-benzoylamino-5-chloroanthraquinone was added portionwise thereto. The temperature was raised to 110–115° C. and maintained for six hours. The mixture was then cooled and agitated overnight. The mixture was then filtered and the filtrate washed with 50% alcohol. To the filtrate was added 140 cc. water, and the resultant mixture agitated overnight. Filtration was again repeated, the filtrate being washed with 50% alcohol. The resultant compound was found to be 1-benzoylamino-5-phenylthioanthraquinone. The compound was found to dye polyethylene terephthalate in an orange color. The dyeing was measured for sublimation resistance, and marked transfer of color to the sandwiched fabric was observed at 350° F. Staining on cotton was also observed.

What is claimed is:
1. A compound of the formula

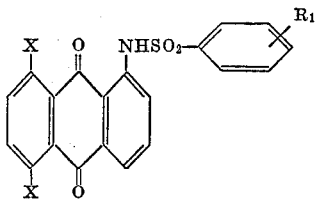

where one X is hydrogen and the other is an arylthio group of the formula

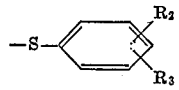

wherein each of $R_1$, $R_2$ and $R_3$ is independently selected from the group consisting of hydrogen, lower alkyl, nitro, lower alkoxy, hydroxy-(lower alkyl), chlorine, and bromine.

2. A compound of claim 1 wherein said arylthio group is in the 8 position.
3. A compound of claim 1 wherein said arylthio group is in the 5 position.
4. A compound of claim 3 of the formula

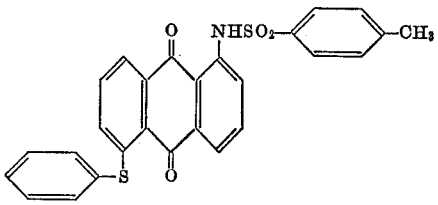

References Cited
UNITED STATES PATENTS

| 3,642,425 | 2/1972 | Gehrke et al. | 260—371 |
| 3,165,516 | 1/1965 | Altermatt | 260—371 |

LORRAINE A. WEINBERGER, Primary Examiner

E. J. SKELLY, Assistant Examiner

U.S. Cl. X.R.

8—39; 260—37 R, 37 EP, 37 N, 37 P, 40 R, 41 C